United States Patent [19]

Kramer

[11] Patent Number: 4,733,573
[45] Date of Patent: Mar. 29, 1988

[54] TRANSMISSION SHIFT CONTROL MECHANISM

[75] Inventor: Richard L. Kramer, Saginaw, Mich.

[73] Assignee: General Motors Corporation, Detroit, Mich.

[21] Appl. No.: 866,378

[22] Filed: May 23, 1986

[51] Int. Cl.$^4$ ............................................. B60K 20/06
[52] U.S. Cl. ................................ 74/473 SW; 74/107
[58] Field of Search ............... 74/473 SW, 96, 104, 74/107

[56] References Cited

U.S. PATENT DOCUMENTS

| | | | |
|---|---|---|---|
| 3,488,955 | 1/1970 | Buelow | 74/96 |
| 3,575,062 | 4/1971 | Kitzner et al. | 74/473 SW |
| 3,646,828 | 3/1972 | Milton et al. | 74/473 SW |
| 3,766,799 | 10/1973 | De Sloovere | 74/475 |
| 4,232,565 | 11/1980 | Leonheart | 74/104 |
| 4,537,088 | 8/1985 | Kubota et al. | 74/473 SW |

*Primary Examiner*—Rodney H. Bonck
*Assistant Examiner*—David A. Testardi
*Attorney, Agent, or Firm*—Donald F. Scherer

[57] ABSTRACT

A transmission steering column mounted shift arrangement has an actuator lever pivotally mounted on the steering column. The actuator lever has a cam track which cooperates with the manual shift control lever to pivot the actuating lever. The actuating lever also has an output arm to which a transmission shift cable is secured. The shift cable moves substantially linearly when the actuator lever is pivoted.

3 Claims, 3 Drawing Figures

TRANSMISSION SHIFT CONTROL MECHANISM

BACKGROUND OF THE INVENTION

This invention relates to steering column mounted transmission control mechanisms and more particularly to such mechanisms having a flexible cable connection with the transmission.

Prior art column mounted shift mechanisms use a shift tube which is operated by the manual shift lever and extends the full length of the mast jacket. A linkage is connected from a lever arm disposed at the distal end of the shift tube for transmitting the shift movement to the transmission.

With the introduction of front wheel drive type power trains, most shift mechanisms have been installed as floor mounted shift mechanisms rather than column mounted shift mechanisms. The floor mounted shift mechanisms permit the use of flexible cable connections between the shift lever and the transmission which reduces the routing problems and engine roll problems associated with front wheel drives.

SUMMARY OF THE INVENTION

The present invention eliminates some of the column mounted shift mechanism components and provides for a cable connection between the column mounted shift mechanism and the transmission to be controlled. The present invention incorporates an actuator lever or bellcrank pivotally disposed on the mast jacket in close proximity with the manual shift control lever. The actuator lever has an output arm which is connected by a flexible cable with the transmission to be controlled. Therefore, the shift tube normally associated with such mechanisms is eliminated.

The actuator lever has an input arm in which is disposed a cam slot or track. A drive ball operated by the manual shift lever engages the cam track such that during manual manipulation of the control lever, pivoting of the actuator lever will occur.

The cam track can be shaped to provide relationships other than linear between the manual lever movement and the cable movement. The cam track shape can also be utilized to control the shift lever effort required at the manual lever.

The cable connection at the actuator lever is disposed on the steering column inside the operator compartment in a clean environment. With this arrangement, automatic cable adjustment mechanisms can be utilized and the assembly of the transmission control is simplified.

It is an object of this invention to provide an improved column mounted transmission shift control mechanism wherein the manual shift lever is operable to pivotally control an actuator arm which has connected therewith a flexible control cable for controlling the transmission operating condition.

It is another object of this invention to provide an improved steering column mounted transmission shift control mechanism wherein an actuator lever assembly has an input arm which is drivingly connected through a cam slot and driver with the manual control lever and an output arm which is operatively connected to a control cable which controls the transmission operating condition and wherein the cam and driver arrangement are operable to change equal displacement movements of the manual lever to the unequal control movements required by the transmission.

It is a further object of this invention to provide an improved steering column mounted transmission shift control mechanism wherein the operator control lever is mounted for rotary or angular displacement about the steering column and is connected to an actuator lever through a cam drive arrangement and also wherein the actuator lever is pivotally mounted on the steering column and includes an output member which is connected with a flexible control cable such that the rotary or angular displacement of the manual lever results in substantially linear movement of the flexible control cable.

It is a still further object of this invention to provide an improved steering column mounted transmission shift control mechanism wherein the operator control lever is mounted for rotary or angular displacement about the steering column and is connected to an actuator lever through a cam drive arrangement and also wherein the actuator lever is pivotally mounted on the steering column and includes an output member which is connected with a flexible control cable such that the rotary or angular displacement of the manual lever is modified by the cam drive and actuator lever to cause linear movement of the control cable and wherein the relationship between the manual lever displacement and the control cable movement is not constant.

DESCRIPTION OF THE DRAWINGS

These and other objects and advantages of the present invention will be more apparent from the following description and drawings.

Referring to the drawings, wherein like characters represent the same or corresponding parts throughout the several views, there is seen a steering column assembly 10, including a mast jacket 12 which is nonrotatably secured to a portion of the vehicle, not shown.

One end of the mast jacket 12 is surrounded by a shift bowl 14 which is rotatably supported on the mast jacket 12 by a pair of bearings 16 and 18. As seen in FIG. 2, a steer shaft 20 extends down the center of the mast jacket 12 in a conventional manner. The steer shaft 20 is connected with a conventional steering wheel, not shown.

Figure 1:
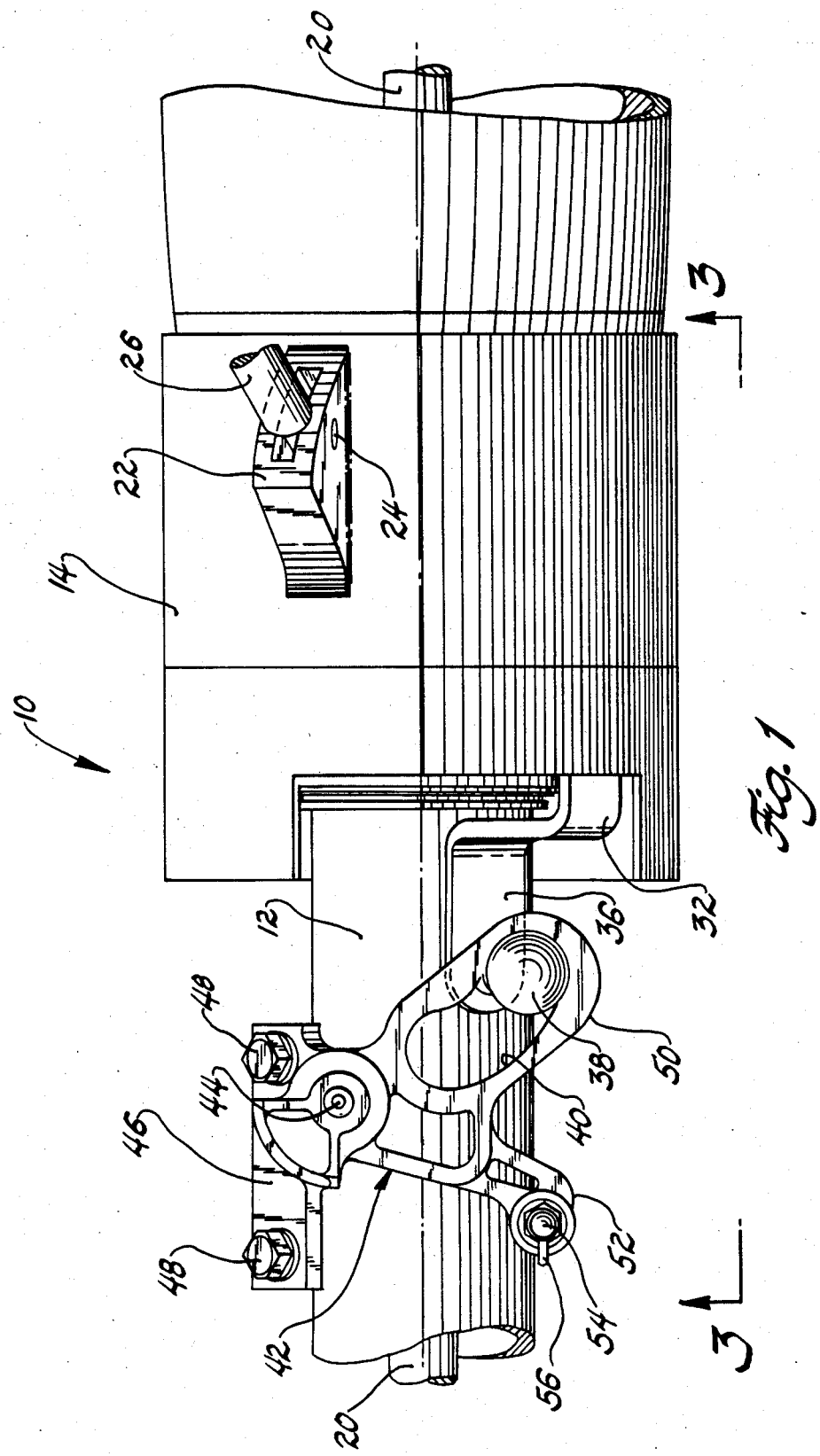
FIG. 1 is an elevational view of a column mounted shift control mechanism at one extent of its movement and incorporating the present invention.

The shift bowl 14 has formed thereon a shift lever mounting extension 22 in which a pin 24 pivotally mounts a manual shift control lever 26. The manual shift control lever 26 and the mountings thereof are conventional and well-known structures. The control lever 26 cooperates with a detent ring 28 and a spring 30 to permit the operator to establish the desired transmission operating conditions in a well-known manner. The lever 26 is manipulated about the mast jacket 12 to a plurality of angularly spaced stops which are established through cooperation of the detent ring 28 and the spring 30.

The shift bowl 14 has secured thereto, by a plurality of fasteners 34, an extension or arm 32. The arm 32 includes a portion 36 on which is secured a ball or cam driver 38. The ball 38 is disposed in a cam track 40 formed in an actuator lever 42.

The actuator lever 42 is pivotally mounted at 44 to a bracket 46 which is secured on the mast jacket 12 by a plurality of fasteners 48. The actuator lever 42 has two integrally formed arms arranged at less than 90 degrees relative to each other disposed thereon, an input arm, or shift lever control arm 50 and an output arm or transmission control arm 52. The arm 50 has the cam track 40 formed therein and the arm 52 has a mounting stud 54 secured thereon. The mounting stud 54 is connected with a conventional flexible drive cable mechanism 56.

The drive cable mechanism 56 is operatively connected to a conventional automatic transmission arrangement 58. If desired, the flexible drive cable mechanism 56 can incorporate one of the well-known automatic cable adjustment mechanisms which are currently available and will be familiar to those skilled in the art.

The extension 32 will rotate about the mast jacket 12 in unison with the rotation of the manual shift control lever 26 about the mast jacket 12. As is well-known, the manual shift lever 26 is movable from a PARK position to a low forward drive range position in the well-known "P-R-N-D-L" pattern. The manual lever 26 is disposed in the PARK position in FIG. 1 and in the low forward operating position in FIG. 2.

Figure 2:
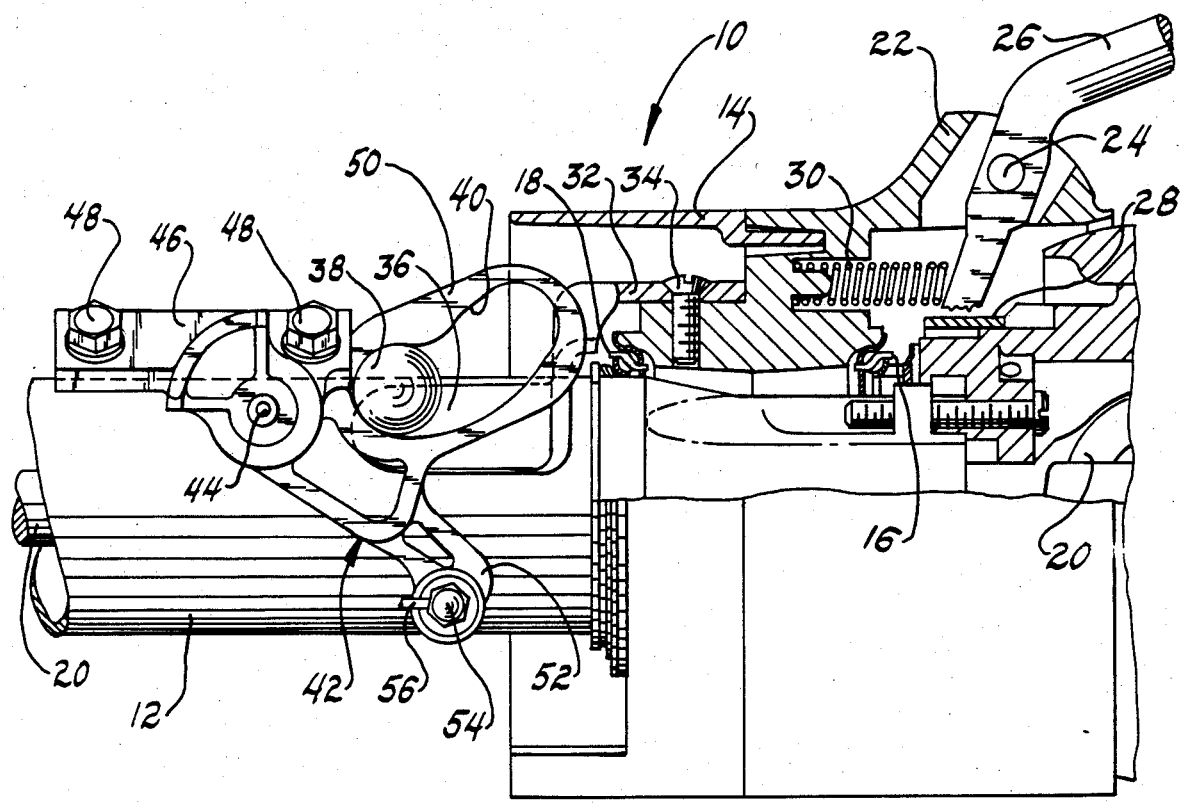
FIG. 2 is a view similar to FIG. 1 showing the shift mechanism at the other extent of its movement.
Figure 3:
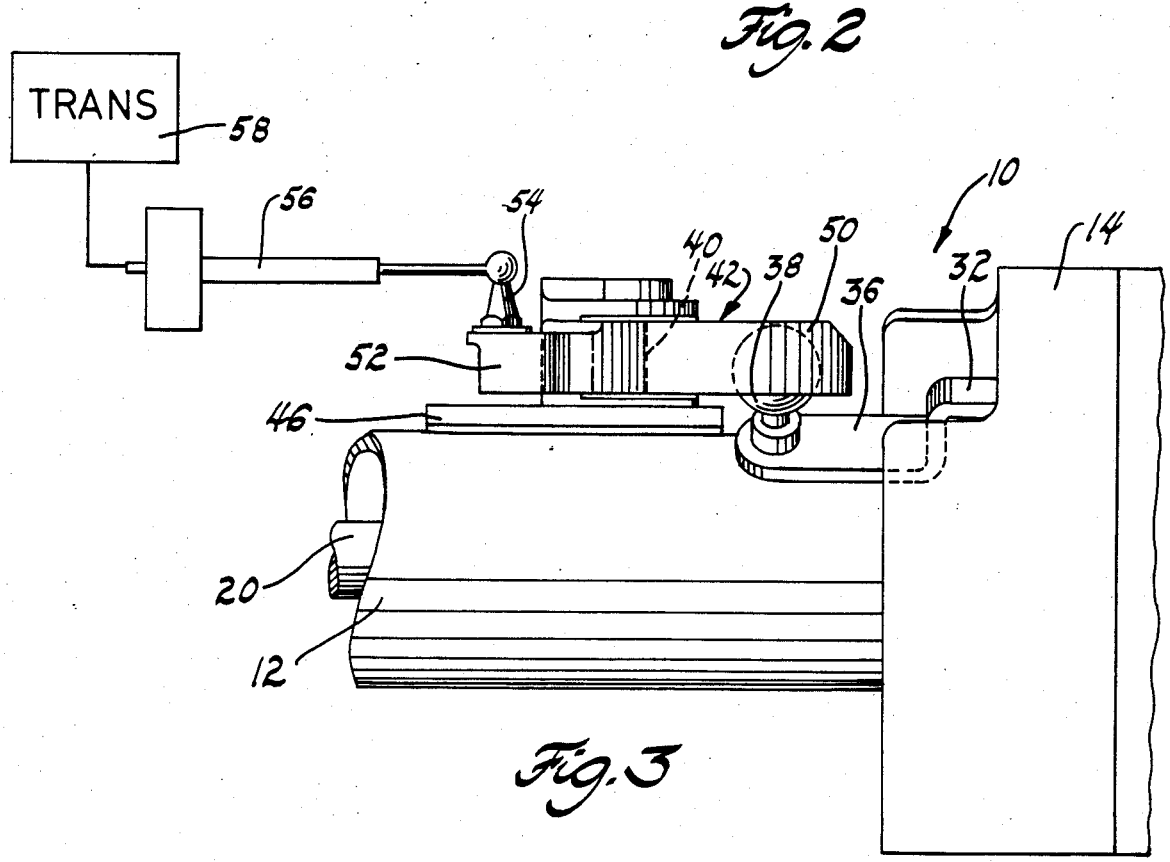
FIG. 3 is a view taken along line 3—3 of FIG. 1.

During rotation of the manual lever 26 and therefore extension 32 and cam driver 38 from the position shown in FIG. 1 to the position shown in FIG. 2, the actuator lever 42 is pivoted about the mounting 44. During pivoting of the actuator lever 42, the end of cable 56 connected to stud 54 will move from the position shown in FIG. 1 to the position shown in FIG. 2. This cable movement controls the transmission between its various operating conditions.

In prior art column mounted arrangements, it is generally required that the shift lever 26 have greater angular movement about the mast jacket 12 during transmission operation between the PARK and REVERSE positions. This is generally necessary because increased travel is required to provide the positioning of the transmission mechanism in the PARK position.

By controlling the shape of cam track 40 it is possible to provide substantially equal angular displacement of the manual lever 26 between the various transmission operating conditions. Therefore, it is possible to have the manual shift lever 26 moved the same angular displacement between PARK and REVERSE as between REVERSE and NEUTRAL or NEUTRAL and DRIVE. Also, by controlling the shape of the cam track 40 and the length of arms 50 and 52, it is possible to control or significantly affect the shift effort required by the operator during manipulation to the various transmission operating conditions.

The ball stud 54 disposed on the transmission control arm 52 travels a slightly arcuate path. For all intents and purposes, however, the cable movement at the ball stud 54 is substantially linear. Therefore, the rotary movement of the manual lever 26 about the mast jacket 12 results in substantially linear control movements at the ball stud 54 and therefore transmission 58.

The actuator lever 42 is disposed as shown on the steering column. The portion of the steering column which mounts the actuator lever is generally positioned immediately under the instrument panel inside the operator compartment. Since the cable mechanism is disposed in a controlled environment, the automatic adjustment of the cable 56 will not be affected by hostile environments such as those occurring under the car or in the engine compartment.

It will, of course, be appreciated by those skilled in the art that proper shrouding or other housing arrangements can be made to deter unauthorized access to the actuator lever.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property of privilege is claimed are defined as follows:

1. A transmission shift control comprising; steering column means; steering column mounted shift bowl means rotatably mounted on said steering column means and including a manual shift lever and arm means having ball means fastened thereto; transmission shift control cable means; actuator lever assembly means pivotally mounted on said steering column means and including integrally formed first and second arm members arranged at less than 90° to each other, said first arm member having a cam slot continuously engaged by said ball means, and said second arm member having connecting means for connecting said actuator lever assembly means to said transmission shift control cable means; said actuator lever assembly means being pivoted by cooperation of said ball means and said cam slot in response to rotary movement of said shift bowl means, and said second arm member and said connecting means being operable to transmit substantially linear movement to said transmission shift control cable means; and power transmission means being selectively shiftable to a plurality of operating positions in response to the linear movement of said transmission shift control cable means.

2. A transmission shift control comprising; steering column means; steering column mounted shift bowl means rotatably mounted on said steering column means and including a manual shift lever and extension means having cam driver means secured thereto and being angularly positionable to a plurality of operating positions; transmission shift control cable means; actuator lever assembly means pivotally mounted on said steering column means and including first and second arm members integrally formed at less than 90° to each other, said first arm member having a cam slot continuously engaged by said cam driver means, and said second arm member having connecting means for connecting said actuator lever assembly means to said transmission shift control cable means; said actuator lever assembly means being pivoted by cooperation of said cam driver means and said cam slot in response to rotary movement of said shift bowl means, and said second arm member and said connecting means being operable to transmit substantially linear movement to said transmission shift control cable means and establish linear positions thereof in response to the rotary movement of said shift bowl, and said cam driver means and cam slot cooperating to establish a continuous relationship between the angular positioning of the shift bowl means and the linear positioning of the transmission shift control cable means; and power transmission means being selectively shiftable to a plurality of operating positions in response to the linear movement of said transmission shift control cable means.

3. A transmission shift control comprising; steering column means; steering column mounted shift bowl means rotatably mounted on said steering column means and including a manual shift lever and arm means having ball means disposed thereon, said manual lever being movable to a plurality of equally angularly spaced positions; transmission shift control cable means; actuator lever assembly means pivotally mounted on said steering column means and including first and second arm members, said first arm member having a cam slot continuously engaged by said ball means, and said second arm member having connecting means for connecting said actuator lever assembly means to said transmission shift control cable means; said actuator lever assembly means being pivoted by cooperation of said ball means and said cam slot in response to rotary movement of said shift bowl means, and said second arm member and said connecting means being operable to transmit substantially linear movement to said transmission shift control cable means to position said transmission shift cable means to a plurality of substantially linearly spaced positions corresponding to respective ones of the angularly spaced positions with a spacing between two of said linearly spaced positions being substantially greater than other spacings between other of said linearly spaced positions; and power transmission means being selectively shiftable to a plurality of operating positions in response to the linear movement of said transmission shift control cable means.

* * * * *